United States Patent [19]
Funsten et al.

[11] Patent Number: 5,545,894
[45] Date of Patent: Aug. 13, 1996

[54] COMPACT HYDROGEN/HELIUM ISOTOPE MASS SPECTROMETER

[75] Inventors: Herbert O. Funsten; David J. McComas, both of Los Alamos, N.M.; Earl E. Scime, Morgantown, W. Va.

[73] Assignee: The Regents of the University of California, Alameda, Calif.

[21] Appl. No.: 434,738

[22] Filed: May 4, 1995

[51] Int. Cl.$^6$ ............................................. H01J 49/26
[52] U.S. Cl. ..................................... 250/281; 250/288
[58] Field of Search ................................. 250/281, 282, 250/288, 288 A, 309, 283

[56] References Cited

U.S. PATENT DOCUMENTS 5,438,194  8/1995  Koudijs et al. ........................ 250/288

OTHER PUBLICATIONS

G. C. Theodoris et al., "Charged Particle Transmission through Cylindrical Plate Electrostatic Analyzers," Rev. Sci. Instrum. 39, 326 (1968).

Herbert Funsten et al., "Ultrathin Foils Used for Low-Energy Neutral Atom Imaging of the Terrestrial Magnetosphere," Opt. Eng. 32, 3090 (1993).

Y. K Bae et al., "A Search for $H_2^-$, $H_3^-$, and Other Metastable Negative Ions," in *Production and Neutralization of Negative Ions and Beams*, K. Prelec, Ed. (American Institute of Physics, New York, 1984) pp. 90–95.

H. H. Andersen et al. "Sputtering Yield Measurements," in *Sputtering by Particle Bombardment I*, R. Behrisch, Ed., (Springer–Verlag, 1981) p. 166.

Primary Examiner—Bruce C. Anderson
Assistant Examiner—Kiet T. Nguyen
Attorney, Agent, or Firm—Samuel M. Freund

[57] ABSTRACT

The compact hydrogen and helium isotope mass spectrometer of the present invention combines low mass-resolution ion mass spectrometry and beam-foil interaction technology to unambiguously detect and quantify deuterium (D), tritium (T), hydrogen molecule ($H_2$, HD, $D_2$, HT, DT, and $T_2$), $^3$He, and $^4$He concentrations and concentration variations. The spectrometer provides real-time, high sensitivity, and high accuracy measurements. Currently, no fieldable D or molecular speciation detectors exist. Furthermore, the present spectrometer has a significant advantage over traditional T detectors: no confusion of the measurements by other beta-emitters, and complete separation of atomic and molecular species of equivalent atomic mass (e.g., HD and $^3$He).

24 Claims, 2 Drawing Sheets

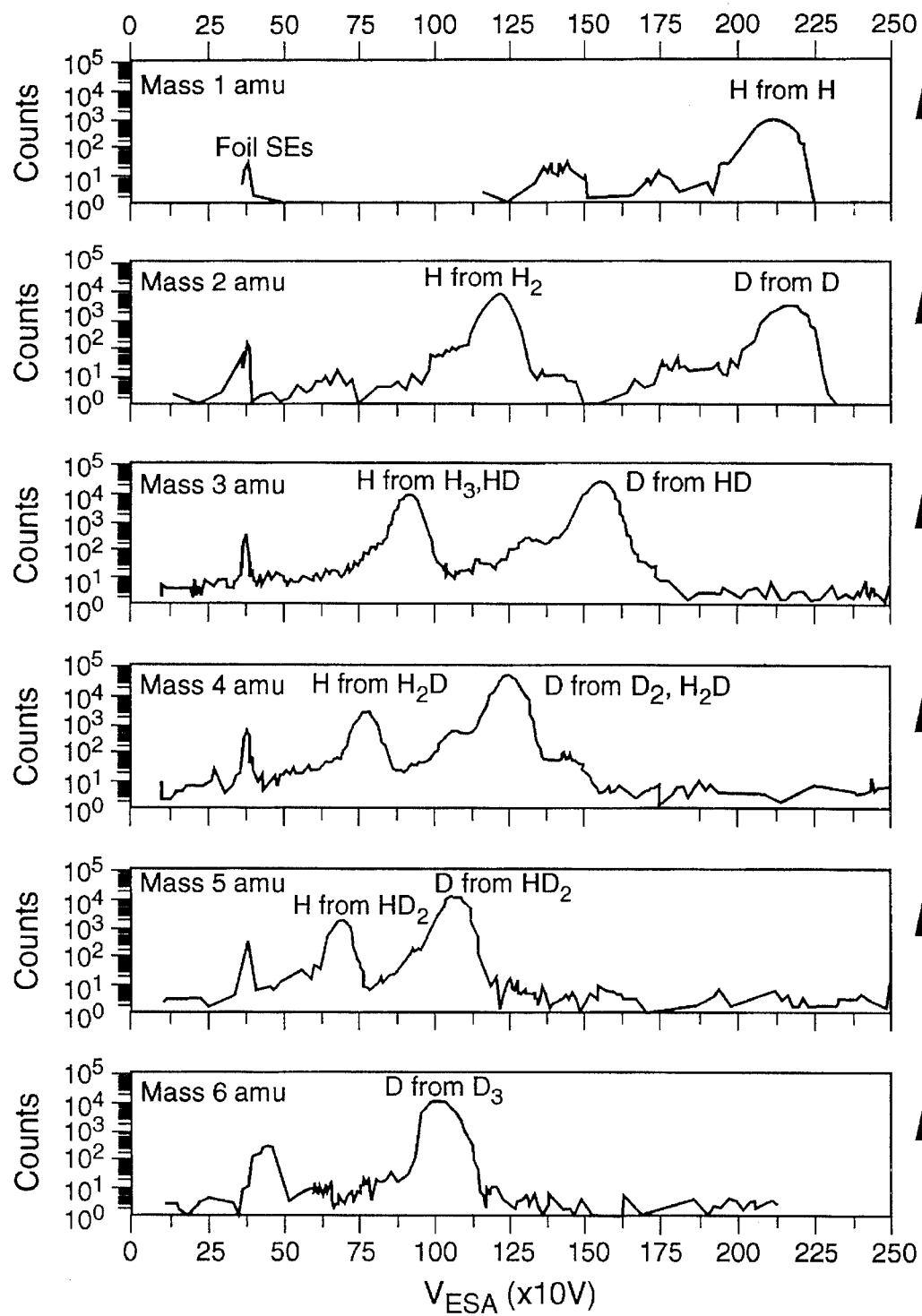

COMPACT HYDROGEN/HELIUM ISOTOPE MASS SPECTROMETER

FIELD OF THE INVENTION

The present invention relates generally to the determination of hydrogen and helium isotopic ratios by mass spectrometry and, more particularly, to the combination of low mass-resolution ion mass spectrometry with beam-foil interaction technology in order to detect and quantify hydrogen and helium isotope concentrations and variations thereof. The invention was made with government support under Contract No. W-7405-ENG-36 awarded by the U.S. Department of Energy to the Regents of The University of California. The government has certain rights in the invention.

BACKGROUND OF THE INVENTION

Current tritium (T, $^3$H) detectors can be divided into two categories: high resolution isotope mass spectrometers located at remote analysis stations, and field units which detect tritium by detecting beta emission from this unstable species. Ion mass spectrometry has been used to detect trace amounts of tritium directly or by an increase in the concentration of its decay product, $^3$He. However, a mass resolution of m/Δm>$10^5$ is required to separate the tritium mass spectrum from that of $^3$He, and accurate measurements of $^3$He variation typically require more than one month. The sensitivity, complexity, size and cost of instrumentation having the necessary resolution prohibits its application to real-time, on-site analyses.

As stated, existing fieldable detectors (e.g., ion chambers) measure tritium concentration from detection of its beta emission. However, the presence of other beta-emitting species (e.g., $^{22}$Ra, $^{41}$Ar, or $^{85}$Kr) or gamma radiation can render this measurement ambiguous. Furthermore, due to the relatively long half-life of tritium (12.33 years), a substantial quantity of tritium is required in a sample for real-time measurements employing beta emission. This typically limits the sensitivity of real-time, beta-decay instruments to approximately 0.01 ppb.

On-site detection of deuterium (D, $^2$H) using traditional low-mass-resolution mass spectrometry is prohibitive due to the presence of other isobaric (essentially equivalent atomic mass) species such $^1$H$_2$ and $^4$He$^{+2}$ that make the measurement ambiguous.

Accordingly, it is an object of the present invention to provide a compact, rugged, low-mass-resolution apparatus for real-time quantitative detection of isotopes of hydrogen and helium.

Another object of the present invention is to provide a compact, rugged, low-mass-resolution apparatus for real-time quantitative detection of the molecular form of hydrogen atoms having different isotopic components.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus for detecting and quantifying the isotopes of hydrogen and helium and the isotopic components of molecular hydrogen in a sample (solid, liquid or gas) in the presence of other isobaric species, hereof, may include means for ionizing a portion of the sample (either positively or negatively), accelerating the ions generated thereby and forming a substantially monoenergetic ion beam; means for separating ions having atomic masses between two and six amu from both heavier and lighter ions, and further separating ions having atomic masses between two and six amu into ion beams having a chosen q/m ratio and a chosen direction, where q is the charge of the ion, and m is the mass of the ion; a thin foil, placed in the chosen direction and adapted for receiving the ions selected by the means for separating ions having a chosen q/m ratio, for converting a portion of the ions of hydrogen (positive or negative) into negative ions and for dissociating a portion of the hydrogen molecular ions present in the ion beam into negative atomic hydrogen ions, while preventing the emergence of isotopes of helium as negative ions; an electrostatic or a magnetic analyzer for separating the singly-charged negative ions according to their energy/q or momentum/q thereof, respectively; a detector for measuring single ions or an ion current; and means for counting the number of ions or measuring the ion current for ions having a given energy/q or momentum/q, respectively.

In another aspect of the present invention, and in accordance with its objects and purposes, the apparatus for detecting and quantifying the isotopes of hydrogen and helium and the isotopic components of molecular hydrogen in a sample (solid, liquid or gas) in the presence of other isobaric species, hereof, may include means for ionizing a portion of the sample (either positively or negatively), accelerating the ions forms thereby and forming a substantially monoenergetic ion beam thereof; means for separating ions having atomic masses between one and six amu from heavier ions, and further separating ions having atomic masses between one and six amu into ion beams having a chosen q/m ratio and a chosen direction, where q is the charge of the ion, and m is the mass thereof; a thin foil, placed in the chosen direction and adapted for receiving ions selected by said ion separating means having a chosen q/m ratio, for converting a portion of the incident ions of hydrogen (either positive or negative) into negative ions, and for dissociating a portion of the positive hydrogen molecular ions present in the ion beam into negative atomic hydrogen ions, while preventing the emergence of isotopes of helium as negative ions, an electrostatic or magnetic analyzer for separating the negative hydrogen ion isotopes derived from molecular hydrogen isotopes which are derived from atomic hydrogen isotopes according to the energy/q or momentum/q thereof, respectively; means for detecting single ions or an ion current; and means for counting the number of ions or measuring the ion current for ions having a given energy/q or momentum/q, respectively.

In yet another aspect of the present invention, and in accordance with it objects and purposes, the apparatus for detecting and quantifying tritium in the presence of $^3$He in a sample, hereof, may include in combination: means for ionizing a portion of the sample and accelerating the ions generated thereby to form a substantially monoenergetic ion beam thereof, a thin foil, placed in the path of the ion beam and adapted for receiving ions, for converting a portion of the tritium ions into negative ions, and for dissociating a portion of the molecular tritium ions present in the ion beam into negative atomic tritium ions, while preventing the emergence of isotopes of helium as negative ions, electrostatic or magnetic means for separating the negative tritium ions derived from molecular tritium isotopes which are derived from atomic tritium according to the energy/q or momentum/q thereof, respectively, means for detecting single ions or an ion current; and means for counting the number of ions or measuring the ion current for ions having a given energy/q or momentum/q, respectively.

Benefits and advantages of the present invention include real-time, high sensitivity and high accuracy quantitative mass measurements, no confusion by other beta-emitters, and complete separation of atomic and molecular species of equivalent atomic mass.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIGS. 2a–f are spectra obtained using the apparatus illustrated in FIG. 1, hereof, for a sample of gaseous mixture of hydrogen and deuterium having approximately 0.5:1 atomic ratio of H to D.

DETAILED DESCRIPTION

Figure 1:
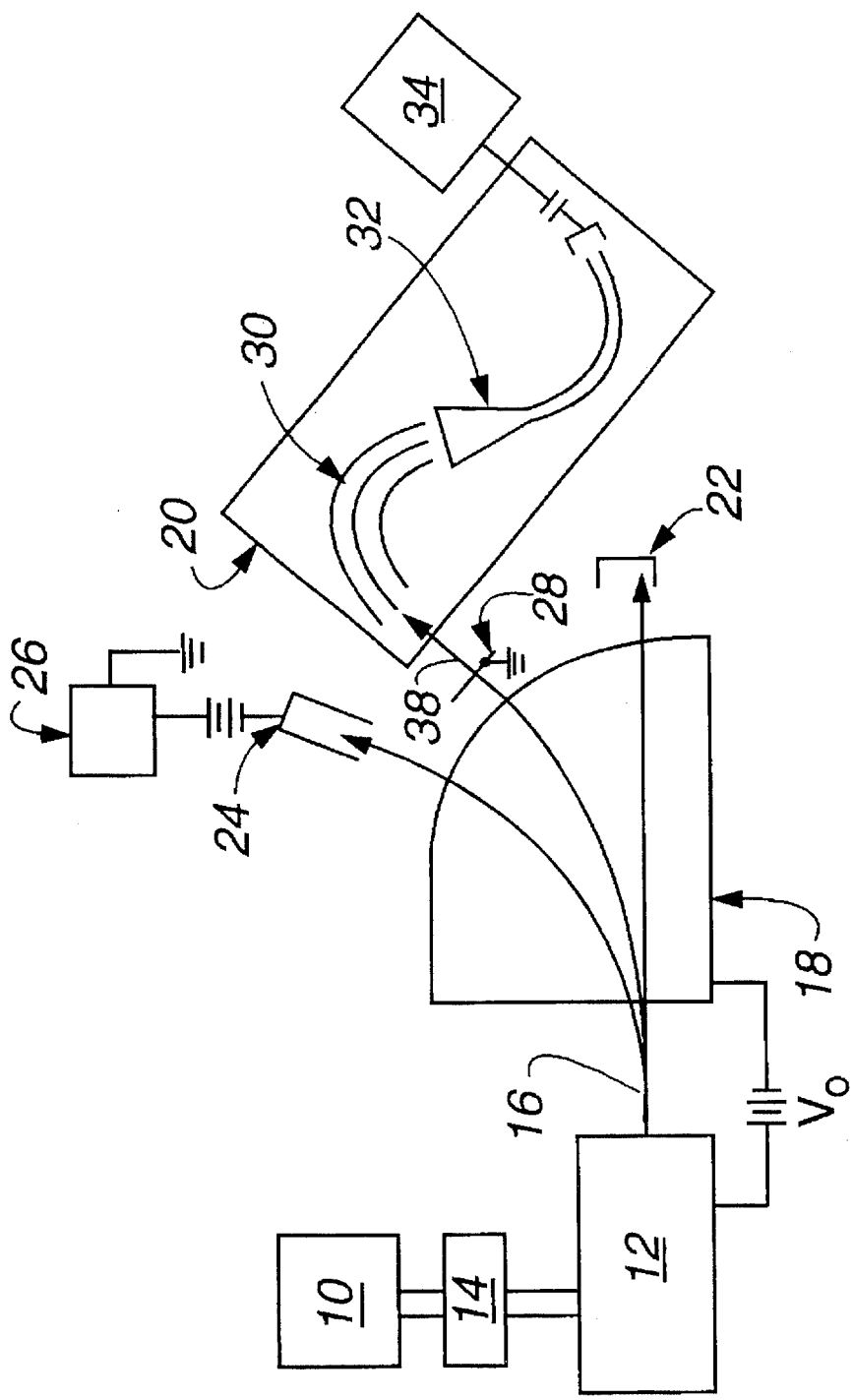
FIG. 1 is a schematic representation of the compact hydrogen/helium mass spectrometer of the present invention.

Briefly, the compact hydrogen isotope mass spectrometer of the present invention is based on beam-foil interaction technology and low-mass-resolution mass spectrometry. The detector utilizes an ultrathin (approximately 1 μg cm$^{-2}$, or, 50 Angstroms) carbon foil through which a magnetically mass-per-charge (m/q) selected ion beam passes where m/q≈1–6 amu/q. The isotopes of hydrogen (H, D, and T) have specific probabilities of exiting an ultrathin foil as a negative ion. However, $^3$He will not exit the foil as a negative ion, nor will hydrogen molecules exit as unfragmented negative ions. Thus, by using beam-foil interactions, D and T are readily separated from other species having similar mass, and can be uniquely detected using negative ion mass spectrometry and single particle detectors. Hydrogen ($^1$H) has no isobaric interferences and can easily be detected. This results in high-sensitivity, real-time D and T measurements using a rugged, lightweight, low-power, fieldable instrument. For measurement of atmospheric samples, an absolute concentration measurement of D and T requires comparison to a measurement of known concentration; the simplest procedure is through a measurement of H, which can be tied to an atmospheric concentration based, for example, on a humidity measurement. For process control measurements, however, this approach is likely inapplicable. For broad application of the present technology, a fiducial measurement may not be required. Furthermore, there is no loss of accuracy due to the presence of other beta-decay species, and there is no interference from nearby gamma sources. Since hydrogen molecules (for example, $H_2$, HD, $D_2$, HT, DT, and $T_2$) will not exit the foil as negative molecular ions, and most will be fragmented by the foil with some atomic fragments exiting as negative ions, the kinetic energy of the parent molecule is partitioned in the atomic fragments based on the atomic mass relative to the parent molecule mass, so that energy analysis of the molecular fragments provides a unique signature for molecular species identification.

Reference will now be made in detail to the present preferred embodiments of the present invention, examples of which are illustrated in the accompanying drawings. Turning now to FIG. 1, a schematic representation of the compact hydrogen/helium isotope mass spectrometer of the present invention is illustrated. A gaseous, liquid or solid sample to be investigated from source, 10, is admitted into an ion source, 12, after being processed, if required, by processor, 14, which may be, for example, a selective membrane, to substantially remove unwanted species other than hydrogen and/or helium. A portion of the molecular species are dissociated, and atoms and molecules are ionized in the ion source 12. Ions (positive or negative, depending on the ion source) are extracted and accelerated by an ion source voltage $V_0$ to an energy $E_0=qV_0$, forming an ion beam, 16, which is directed into magnet, 18. The magnetic field (or, if a permanent magnet is used, $V_0$, the accelerating voltage) is adjusted so that ions with a unique mass-per-charge (m/q) transit the magnet and enter detection apparatus, 20. Ions having higher mass are directed into beam stop, 22, while, if there is a sufficiently high flux of, for example, H atoms, species having m/q=1 (principally H atoms) are directed into Faraday cup, 24, biased to an appropriate voltage by voltage supply, 26, for proper collection of the H$^+$ ions. Other m/q species that can be selected to enter detection apparatus, 20, include m/q=2 species (H$^{+2}$, D$^+$, and $^4$He$^{+2}$), m/q=3 species (T$^+$, $^3$He$^+$, HD$^+$, and H$_3{}^+$), m/q=4 species (HT$^+$, $^4$He$^+$, D$_2{}^+$, and H$_2$D$^+$), m/q=5 species (DT$^+$ and HD$_2{}^+$), or m/q=6 species (D$_3{}^+$ and T$_2{}^+$). The m/q=6 species may also include $^{12}$C$^{+2}$, although the energy of such species is 2$V_0$ and provides simple rejection by the electrostatic analyzer of the converted C$^-$ ions. It should be pointed out that if there is only a small flux of H atoms, species with m/q=1 (H) are also admitted into detection apparatus, 20.

Detection apparatus, 20, includes: (1) an ultrathin (for example, ~50 Å thick) carbon foil, 28 (which may be grounded as shown or biased); (2) an electrostatic analyzer (ESA), 30, having an adjustable energy-per-charge ($E_0$/q) passband (See, for example, G. C. Theodoris et al., "Charged Particle Transmission through Cylindrical Plate Electrostatic Analyzers," Rev. Sci. Instrum. 39, 326 (1968)); (3) a single particle detector, 32, for example, a channel electron multiplier (CEM) or microchannel plate(s); and a data collection and analysis system, 34. Negative ions, 38, leaving foil, 28, enter ESA, 30, and are sorted according to their energy-per-charge.

Ultrathin (~50 Å) carbon foils in tandem with an electrostatic analyzer can remove isobaric interferences. Atomic hydrogen isotopes (H, D, and T) have well defined probabilities of exiting the foil as negative ions, and this probability is the same for each isotope at a given velocities (a maximum of 6% exit as negative ions at energies between 3.5 and 4 keV/amu. See, e.g., Herbert Funsten et al., "Ultrathin Foils Used for Low-Energy Neutral Atom Imaging of the Terrestrial Magnetosphere," Opt. Eng. 32, 3090 (1993)). Molecular hydrogen cannot exit the foil as negative ions at ≧1 ppm levels due to molecular dissociation in the foil and the inability of the molecular species to form negative molecular hydrogen, for example, $H_2{}^-$ or HD$^-$. However, these molecules can dissociate to form negative atomic species, the exit energy of each atomic fragment being partitioned according to its mass relative to its parent molecule. Thus, the atomic species can be uniquely identified by sweeping the ESA. For example, D$^-$ from dissociation of HD (m/q=3 amu; $E_0$≈12 keV) enters the detector apparatus with a maximum energy of 8 keV (some energy loss in the foil is encountered), whereas T$^-$ (m/q≈3 amu;

$E_0 \approx 12$ keV) from $T^+$ is detected at energies of 8 to 12 keV. Thus, by sweeping the ESA energy passband, D from HD (and therefore the relative concentration of HD) can be uniquely measured. Laboratory measurements by the present inventors show a large number of neutral species ($H^0$ and $H_2^0$), a small number of $H_2^+$ ions, and no observable $H_2^-$ to an upper limit of $10^{-6}$, and due to the chemical similarity of H, D, and T, apply to all hydrogen molecules. The observed absence of $H_2^-$ agrees with other studies in which the production of $H_2^-$ relative to $H_2^+$ for $H_2$ reflected from a low work-function surface is $<4 \times 10^{-9}$. See, for example, Y. K. Bae et al., "A Search for $H_2^-$, $H_3^-$, and Other Metastable Negative Ions," in *Production and Neutralization of Negative Ions and Beams*, K. Prelec, Ed. (American Institute of Physics, New York, 1984) pp. 90–95.

Ultrathin foils provide a mechanism to separate T from $^3$He, since <0.1 ppm of $^3$He will form a negative ion upon exiting the foil. This is based on results of an experiment by the present inventors in which 10 keV $^3$He ions transited a foil. After exiting the foil, the ions were directed into a cylindrical electrostatic analyzer. $^3$He ions that passed through the electrostatic analyzer were detected using a microchannel plate detector. A large number of $^3$He ions were found to exit the foil as He$^+$ and a small number exited as He$^{+2}$. Upon reversing the polarities of the electrostatic analyzer plates, no He$^-$ distribution above the background was observed. Since the probability that He exits the foil as a neutral atom is greater than 95% for energies less than 20 keV (See, e.g., Herbert Funsten et al., supra.), analysis of the data (integration of the He$^+$ peak, curve fitting analysis on the background in the He$^-$ peak location based on the shape of the He$^+$ distribution, and error due to counting statistics) leads to the conclusion that the probability of He emerging from the foil as a negative ion has an upper limit of $1.2 \times 10^{-7}$, and is likely much lower. Due to the chemical similarity, results for $^3$He also apply to $^4$He. One might attempt to extract T$^-$ directly from the ion source (by reversing the sign of the accelerating voltage, $V_0$), without the use of a foil; however, metastable He$^-$ is also formed in such an ion source with a lifetime of 350 μs (sufficient time to reach the detector in the present spectrometer), so that foils are required for their unique ability of not forming He$^-$.

Therefore, the selectivity of the present low-mass-resolution mass spectrometer apparatus permits the separation of T from the isobaric species $^3$He and HD. This is performed by passing the species through an ultrathin carbon foil. Using H and D in addition to $^3$He and $^4$He, the present inventors have observed that the exit charge state distribution is independent of the isotopic species at a given exit velocity. This result is in agreement with other published data.

Since the concentration of $^3$He is generally substantially greater than that of T (usual background concentrations of $^3$He are >10$^7$ greater than that of T), $^3$He can be measured directly by reversing the ESA plate voltages so that positive ions with m/q=3 amu (both T$^+$ and $^3$He$^+$) that exit the foil are detected. The T$^+$+$^3$He$^+$ measurement consists predominantly of $^3$He; for example, in atmospheric gaseous samples, the $^3$He concentration can be quantified. Helium-4 ($^4$He) may be measured by reversing the ESA plate voltages so that positive ions with m/q=4 amu which exit the foil will be detected. If the concentration of $^3$He is much less than that of T, then the small fraction (for example, 0.2%@35 keV) of $^3$He existing as $^3$He$^{+2}$ will be observed at an $E_0/q$ of ½ (for which no isobaric interferences exist), whereas T will be detected an $E_0/q$ of $E_0$.

The features of projectile-foil interactions result in unambiguous detection of D, T, $^3$He, and hydrogen molecule species with high sensitivity, since the ions generated are detected using a single particle detector having typical detection efficiencies of ~70% which is approximately independent of hydrogen isotope over the detected energy range employed. An instrument sensitivity of <0.00001 ppb (<2 fCi/cm$^3$ for T) is based on the following conservative estimates: a membrane sample selectivity of H species of 1000, an atomic ion beam current of 5 μA, and a negative ionization probability of D and T by the foil of 0.05, miscellaneous transport losses (including scattering and energy loss in the foil) of 0.60, and a detection efficiency of 0.7. The accuracy of the present spectrometer depends on the species detected, its abundance, the ultimate count rate, and the signal-to-noise ratio. The following conservative assumptions are listed in Table 1, and the accuracy is calculated based on Poisson counting statistics.

TABLE 1

| Species | Abundance | Counts Accumulated in 1 minute | % accuracy after 1 minute | % accuracy after 10 minutes |
|---------|-----------|-------------------------------|---------------------------|-----------------------------|
| T | $10^{-12}$ | 600 | 4.1 | 1.3 |
| D | $10^{-7}$ | $6 \times 10^7$ | 0.01 | 0.004 |
| D$^2$ | $10^{-10}$ | $1.2 \times 10^5$ | 0.29 | 0.09 |
| T$^2$ | $10^{-13}$ | 120 | 9.1 | 2.9 |
| DT | $10^{-11}$ | $1.2 \times 10^4$ | 0.91 | 0.29 |
| $^3$He | $10^{-11}$ | 6000 | 1.3 | 0.41 |

Degradation of the carbon foils used in the present apparatus (1 μg/cm$^2$ or 50 Å thick) define the usable lifetime of the instrument. Based on available sputter data for H, D, and $^4$He on evaporated carbon (See, e.g., H. H. Andersen et al. "Sputtering Yield Measurements," in *Sputtering by Particle Bombardment I*, R. Behrisch, Ed., (Springer-Verlag, 1981) p. 166), the sputter yield (sputtered atoms per incident projectile) for the carbon foil (including both the entrance and exit surfaces) is <0.5. For a 40 Å thick carbon foil, there are $4.5 \times 10^{16}$ atoms/cm$^2$; for a 0.2×0.2 cm aperture immediately preceding the foil, the area of bombardment contains approximately $1.8 \times 10^{15}$ atoms. It would take approximately $1 \times 10^{14}$ incident ions to sputter 10% of the foil, for a sputter yield of 0.5. For an incident ion flux of <$10^9$ ions/sec (to which the foil will be exposed during a measurement using the present apparatus), foil degradation should not be an issue.

Having generally described the invention, the following example sets forth the use of the present mass spectrometer to quantitatively identify the isotopes of hydrogen and helium.

EXAMPLE

Identification of molecular species is based on the foil-induced dissociation of molecules into atomic fragments, some of which exit the foil as negative ions. The maximum energy (some energy loss in the foil may be realized) of an atomic fragment at the exit surface of the foil is equal to the product of the energy of the incident molecule and the ratio of the atomic fragment mass to the parent molecule mass. For example, if ions having m/q=3 amu are to be measured, the following species may be present at the foil: H$_3^+$ (possibly generated in the ion source), HD$^+$, T$^+$, and $^3$He$^+$. If negative ions emerging from the foil are analyzed with the electrostatic analyzer, however, $^3$He would not be detected, since it does not form a negative ion after transiting the foil. Negative ions that would be detected are H$^-$ from both H$_3$ and HD, D$^-$ from HD, and T$^-$. If, for example, the energy of these species was 12 keV at the foil, then the maximum energy upon exiting the foil of an H fragment, D fragment, and T are 4 keV, 8 keV, and 12 keV, respectively. Therefore, by scanning the electrostatic analyzer through narrow energy passbands, each of these species can be uniquely identified. Species identification would take place as follows: First, the mass-per-charge m/q is chosen by selecting the strength of the magnetic field and/or the accelerating voltage of ions exiting the ion source. Then, all positive ion species in each mass-per-charge setting that may exit the ion source are listed. Possible negative ions (H$^-$, D$^-$, and T$^-$) that can be observed resulting from the transit of the positive ion species through the foil are then listed, and the energy of each of the detected atomic negative ions that exit the foil is observed and compared to the energy, $E_0=qV_0$, of the positive ion beam incident on the foil. The results are illustrated in Table 2, hereinbelow.

TABLE 2

| | Possible | Detected negative ion species or species fragment | | |
|---|---|---|---|---|
| Mass per charge (amu) | Species exiting ion source | Energy of detected H$^-$ | Energy of detected D$^-$ | Energy of detected T$^-$ |
| 1 | H$^+$ | $E_0$ | | |
| 2 | H$_2^+$ | ½ $E_0$ | | |
|   | D$^+$ | | $E_0$ | |
|   | $^4$He$^{+2}$ | | No negative ion | |
| 3 | H$_3^+$ | ⅓ $E_0$ | | |
|   | HD$^+$ | ⅓ $E_0$ | ⅔ $E_0$ | |
|   | T$^+$ | | | $E_0$ |
|   | $^3$He$^+$ | | No negative ion | |
| 4 | H$_2$D$^+$ | ¼ $E_0$ | ½ $E_0$ | |
|   | D$_2^+$ | | ½ $E_0$ | |
|   | HT$^+$ | ¼ $E_0$ | | ¾ $E_0$ |
|   | $^4$He$^+$ | | No negative ion | |
| 5 | HD$_2^+$ | ⅕ $E_0$ | ⅖ $E_0$ | |
|   | DT$^+$ | | ⅖ $E_0$ | ⅗ $E_0$ |
|   | H$_2$T$^+$ | ⅕ $E_0$ | | ⅗ $E_0$ |
| 6 | T$_2^+$ | | | ½ $E_0$ |
|   | D$_3^+$ | | ⅓ $E_0$ | |

FIGS. 2a–f (corresponding to atomic mass numbers 1–6 selected in the ion source, respectively) show experimental data from the low-resolution mass spectrometer of the present invention, in part illustrating this procedure. Each panel corresponds to one m/q species that is chosen by the magnetic deflection of a monoenergetic beam of positive ions. In each panel, the detected count rate of negative ions is plotted as a function of the electrostatic analyzer potential, $V_{ESA}$, which is proportional to the energy of the negative ion after the foil. For these measurements, $E_0$ corresponds to approximately $V_{ESA} \approx 2300$ V. The conditions were: a gaseous sample of hydrogen and deuterium having a ratio of approximately 0.5:1 H/D, an ion beam energy at the foil of 10 keV, and a detector (CEM) bias of $-2.8$ kV. The foil was biased to $-2.5$ kV to enhance the throughput of negative ions through the electrostatic analyzer.

The highest observed energies of negative ions were 15 keV (=10 keV+2.5 kV acceleration positive ions into the biased foil +2.5 kV acceleration of negative ions away from the foil after their charge conversion from positive to negative in the foil) and corresponds to $V_{ESA} \approx 2300$ V. This is observed for H$^-$ in m/q=1 and D$^-$ in m/q=2. T$^-$ would be observed at a similar location in the m/q=3 panel. Also observed in the m/q =2 panel is H$^-$ from H$_2$ which has an energy of 8.75 keV (=0.5*[10 keV initial+2.5 keV into foil]+2.5 keV out of foil) and corresponds to $V_{ESA} \approx 1300$ kV. In each of the successive panels, the energy of the fragments provides a signature for unique identification of molecular species. Identification of the incident species using the energy of the negative ion fragments is readily obtained by comparing the laboratory results with Table 2.

It should be noted that hydrogen molecules with three atoms (e.g., H$_3$, H$_2$D, H$_2$T, and HD$_2$) are created in the ion source, and formation of HD$_2$ and H$_2$T in the ion source is highly improbable if the concentrations of D and T are small relative to that for H. Furthermore, the background levels are extremely low for $V_{ESA}$ values at which T (m/q=3, 1.85 kV<$V_{ESA}$<2.3 kV), HT (m/q=4, 1.65 kV<$V_{ESA}$<1.9 kV), DT (m/q=5, 1.25 kV<$V_{ESA}$<1.5 kV), and T$_2$ (m/q=4, 1.15 kV<$V_{ESA}$<1.35 kV) would be detected in this proof-of-principle apparatus. Thus, unambiguous molecular species identification is possible with the present apparatus. The peak in each spectrum located at $V_{ESA} \approx 0.38$ kV corresponds to secondary electrons emitted from the exit surface foil that pass through the electrostatic analyzer.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for detecting and quantifying isotopes of hydrogen and helium in a sample, which comprises in combination:

a. means for ionizing a portion of the sample and accelerating the ions generated thereby to form a substantially monoenergetic ion beam thereof;

b. means for separating said ions having atomic masses between two and six amu from both heavier and lighter ions, and further separating said ions having atomic masses between two and six amu into ion beams having a chosen q/m ratio and a chosen direction, where q is the charge of the ion, and m is the mass thereof;

c. thin foil means, placed in the chosen direction and adapted for receiving said ions separated by said ion separating means having a chosen q/m ratio, for converting a portion of the ions of hydrogen into negative ions, and for dissociating a portion of positive hydrogen molecular ions present in the ion beam into negative atomic hydrogen ions, while preventing the emergence of isotopes of helium as negative ions;

d. electrostatic means for separating the negative hydrogen ion isotopes derived from molecular hydrogen isotopes which are derived from atomic hydrogen isotopes according to the energy/q thereof;

e. means for detecting ions; and f. means for counting the number of ions having a given energy/q.

2. The apparatus for detecting and quantifying the isotopes of hydrogen and helium in a sample as described in claim 1, further comprising means for quantitatively detecting positive ions having an atomic mass of less than two.

3. The apparatus for detecting and quantifying the isotopes of hydrogen and helium in a sample as described in claim 2, wherein said means for quantitatively detecting positive ions having an atomic mass of less than two includes a Faraday cup.

4. The apparatus for detecting and quantifying the isotopes of hydrogen and helium in a sample as described in claim 1, wherein said thin foil includes carbon foil.

5. The apparatus for detecting and quantifying the isotopes of hydrogen and helium in a sample as described in claim 1, wherein said means for ionizing a portion of the sample generates positive ions.

6. The apparatus for detecting and quantifying the isotopes of hydrogen and helium in a sample as described in claim 5, wherein said electrostatic means is adapted for analyzing said ions selected from the group consisting of $^3He^+$, $^3He^{+2}$, $^4He^+$, and $^4He^{+2}$.

7. An apparatus for detecting and quantifying isotopes of hydrogen and helium in a sample, which comprises in combination:
   a. means for ionizing a portion of the sample and accelerating the ions generated thereby to form a substantially monoenergetic ion beam thereof;
   b. means for separating said ions having atomic masses between one and six amu from heavier ions, and further separating said ions having atomic masses between one and six amu into ion beams having a chosen q/m ratio and a chosen direction, where q is the charge of the ion, and m is the mass thereof;
   c. thin foil means, placed in the chosen direction and adapted for receiving said ions separated by said ion separating means having a chosen q/m ratio, for converting a portion of the ions of hydrogen into negative ions, and for dissociating a portion of positive hydrogen molecular ions present in the ion beam into negative atomic hydrogen ions, while preventing the emergence of isotopes of helium as negative ions;
   d. electrostatic means for separating the negative hydrogen ion isotopes derived from molecular hydrogen isotopes which are derived from atomic hydrogen isotopes according to the energy/q thereof;
   e. means for detecting ions; and
   f. means for counting the number of ions having a given energy/q.

8. The apparatus for detecting and quantifying the isotopes of hydrogen and helium in a sample as described in claim 7, wherein said thin foil includes carbon foil.

9. The apparatus for detecting and quantifying the isotopes of hydrogen and helium in a sample as described in claim 7, wherein said means for ionizing a portion of the sample generates positive ions.

10. The apparatus for detecting and quantifying the isotopes of hydrogen and helium in a sample as described in claim 9, wherein said electrostatic means is adapted for analyzing said ions selected from the group consisting of $^3He^+$, $^3He^{+2}$, $^4He^+$, and $^4He^{+2}$.

11. An apparatus for detecting and quantifying tritium in the presence of $^3He$ in a sample, which comprises in combination:
   a. means for ionizing a portion of the sample and accelerating the ions generated thereby to form a substantially monoenergetic ion beam thereof;
   b. thin foil means, placed in the path of the ion beam and adapted for receiving said ions, for converting a portion of the tritium ions into negative ions, and for dissociating a portion of positive molecular tritium ions present in the ion beam into negative atomic tritium ions, while preventing the emergence of isotopes of helium as negative ions;
   c. electrostatic means for separating the negative tritium ions derived from molecular tritium isotopes which are derived from atomic tritium according to the energy/q thereof;
   d. means for detecting ions; and
   e. means for counting the number of ions having a given energy/q.

12. The apparatus for detecting and quantifying tritium in the presence of $^3He$ in a sample as described in claim 11, wherein said thin foil includes carbon foil.

13. An apparatus for detecting and quantifying isotopes of hydrogen and helium in a sample, which comprises in combination:
   a. means for ionizing a portion of the sample and accelerating the ions generated thereby to form a substantially monoenergetic ion beam thereof;
   b. means for separating said ions having atomic masses between two and six amu from both heavier and lighter ions, and further separating said ions having atomic masses between two and six amu into ion beams having a chosen q/m ratio and a chosen direction, where q is the charge of the ion, and m is the mass thereof;
   c. thin foil means, placed in the chosen direction and adapted for receiving said ions separated by said ion separating means having a chosen q/m ratio, for converting a portion of the ions of hydrogen into negative ions, and for dissociating a portion of positive hydrogen molecular ions present in the ion beam into negative atomic hydrogen ions, while preventing the emergence of isotopes of helium as negative ions;
   d. magnetic means for separating the negative hydrogen ion isotopes derived from molecular hydrogen isotopes which are derived from atomic hydrogen isotopes according to the momentum/q thereof;
   e. means for detecting ions; and
   f. means for counting the number of ions having a given momentum/q.

14. The apparatus for detecting and quantifying the isotopes of hydrogen and helium in a sample as described in claim 13, further comprising means for quantitatively detecting positive ions having an atomic mass of less than two.

15. The apparatus for detecting and quantifying the isotopes of hydrogen and helium in a sample as described in claim 14, wherein said means for quantitatively detecting positive ions having an atomic mass of less than two includes a Faraday cup.

16. The apparatus for detecting and quantifying the isotopes of hydrogen and helium in a sample as described in claim 13, wherein said thin foil includes carbon foil.

17. The apparatus for detecting and quantifying the isotopes of hydrogen and helium in a sample as described in claim 13, wherein said means for ionizing a portion of the sample generates positive ions.

18. The apparatus for detecting and quantifying the isotopes of hydrogen and helium in a sample as described in claim 17, wherein said magnetic means is adapted for analyzing said ions selected from the group consisting of $^3He^+$, $^3He^{+2}$, $^4He^+$, and $^4He^{+2}$.

19. An apparatus for detecting and quantifying isotopes of hydrogen and helium in a sample, which comprises in combination:
   a. means for ionizing a portion of the sample and accelerating the ions generated thereby to form a substantially monoenergetic ion beam thereof;
   b. means for separating said ions having atomic masses between one and six amu from heavier ions, and further separating said ions having atomic masses between one and six amu into ion beams having a chosen q/m ratio and a chosen direction, where q is the charge of the ion, and m is the mass thereof;

c. thin foil means, placed in the chosen direction and adapted for receiving said ions separated by said ion separating means having a chosen q/m ratio, for converting a portion of the ions of hydrogen into negative ions, and for dissociating a portion of positive hydrogen molecular ions present in the ion beam into negative atomic hydrogen ions, while preventing the emergence of isotopes of helium as negative ions;

d. magnetic means for separating the negative hydrogen ion isotopes derived from molecular hydrogen isotopes which are derived from atomic hydrogen isotopes according to the momentum/q thereof;

e. means for detecting ions; and f. means for counting the number of ions having a given momentum/q.

20. The apparatus for detecting and quantifying the isotopes of hydrogen and helium in a sample as described in claim 19, wherein said thin foil includes carbon foil.

21. The apparatus for detecting and quantifying the isotopes of hydrogen and helium in a sample as described in claim 19, wherein said means for ionizing a portion of the sample generates positive ions.

22. The apparatus for detecting and quantifying the isotopes of hydrogen and helium in a sample as described in claim 21, wherein said magnetic means is adapted for analyzing said ions selected from the group consisting of $^3He^+$, $^3He^{+2}$, $^4He^+$, and $^4He^{+2}$.

23. An apparatus for detecting and quantifying tritium in the presence of $^3He$ in a sample, which comprises in combination:

a. means for ionizing a portion of the sample and accelerating the ions generated thereby to form a substantially monoenergetic ion beam thereof;

b. thin foil means, placed in the path of the ion beam and adapted for receiving said ions, for converting a portion of the tritium ions into negative ions, and for dissociating a portion of positive molecular tritium ions present in the ion beam into negative atomic tritium ions, while preventing the emergence of isotopes of helium as negative ions;

d. magnetic means for separating the negative tritium ions derived from molecular tritium which are derived from atomic tritium isotopes according to the momentum/q thereof;

e. means for detecting ions; and, f. means for counting the number of ions having a given momentum/q.

24. The apparatus for detecting and quantifying the isotopes of hydrogen and helium in a sample as described in claim 23, wherein said thin foil includes carbon foil.

* * * * *